United States Patent [19]

Yamamoto et al.

[11] Patent Number: 4,959,785
[45] Date of Patent: Sep. 25, 1990

[54] CHARACTER PROCESSING SYSTEM WITH SPELLING CHECK FUNCTION THAT UTILIZES CONDENSED WORD STORAGE AND INDEXED RETRIEVAL

[75] Inventors: Yasushi Yamamoto, Kyoto; Keizo Saito, Souraku, both of Japan

[73] Assignee: Sharp Kabushiki Kaisha, Osaka, Japan

[21] Appl. No.: 198,503

[22] Filed: May 25, 1988

[30] Foreign Application Priority Data

May 26, 1987 [JP] Japan .................. 62-128687

[51] Int. Cl.⁵ .......................................... G06F 15/38
[52] U.S. Cl. ..................................... 364/419; 364/900
[58] Field of Search ............................. 364/419, 900

[56] References Cited

U.S. PATENT DOCUMENTS

| | | | |
|---|---|---|---|
| 4,381,551 | 4/1983 | Kanou et al. | 364/900 |
| 4,393,462 | 7/1983 | Tanimoto et al. | 364/900 |
| 4,439,836 | 3/1984 | Yoshida | 364/900 |
| 4,747,053 | 5/1988 | Yoshimura et al. | 364/900 |
| 4,748,589 | 5/1988 | Kanou et al. | 364/900 |
| 4,758,955 | 7/1988 | Chen | 364/419 |
| 4,782,464 | 11/1988 | Gray et al. | 364/900 |
| 4,796,185 | 1/1989 | Yoshimura et al. | 364/419 |

Primary Examiner—Allen MacDonald
Assistant Examiner—Gail O. Hayes

[57] ABSTRACT

A character processing system with a spelling check function including: an input device; a storage for storing character information; a display for displaying the character information or the like; a control unit for storing the character information input from the input device in the storage and also for outputting the character information on the display; a condensed dictionary storage provided with a dictionary proper composed of plural blocks wherein the first word of a block is stored in the form of a noncondensed character string wherein the second and subsequent words are stored in condensed relative code whereby words not transformable into condensed relative code are replaced with modified Huffman codes and provided with and an index section for the dictionary proper which includes offsets and block numbers indicative of plural blocks and spelling check means for performing a retrieval of the keyword from with the condensed dictionary storage means, upon reception of spelling check instructions input from the input means.

11 Claims, 9 Drawing Sheets

Basic Structure of Condensed Dictionary

FIG. 4

| Word | Condensed Word |
|---|---|
| a c a d e m i a | a c a d e m i a |
| a c a d e m i a s | *8 s |
| a c a d e m i c | *7 c |
| a c a d e m i c a l | *8 a l |
| a c a d e m i c a l l y | *10 l y |
| a c a d e m i c i a n | *8 i a n |
| a c a d e m i c i a n s | *11 s |
| ⋮ | ⋮ |

Relative Condensation (*n denotes the condensed
relative code for the duplicated number of letters, n.)

FIG. 5

Dictionary Proper

Block 0 { | A t l a n t a | *6 i c | *7 s | ⋯ |

Block 1 { | A u s t r a l i a | *9 n | ⋯ |

Division of Dictionary Into Blocks

Structure of Index Information Section

| Source Word | Initial Two Letters Deleted | Relative Condensation |
|---|---|---|
| A t l a n t a | l a n t a | l a n t a EOW |
| A t l a n t i c | l a n t i c | *4 i c EOW |
| A t l a n t i s | l a n t i s | *5 s EOW |
| A t r o p o s | r o p o s | r o p o s EOW |
| ⋮ | ⋮ | ⋮ |

Relative Condensation (*n denotes the condensed relative code.)

Dictionary Proper

CHARACTER PROCESSING SYSTEM WITH SPELLING CHECK FUNCTION THAT UTILIZES CONDENSED WORD STORAGE AND INDEXED RETRIEVAL

BACKGROUND OF THE INVENTION

1. Field of the Invention

This invention relates to a character processing system capable of performing spelling checks.

2. Description of the Prior Art

In the spelling checks hitherto performed in this kind of character processing system, the conventional method consists in compiling a two-dimensional table with words in the European language dictionary arranged typically of the order of the initial letters in such words and of the numbers of characters of which such words are composed and then retrieving any appropriate words from the two-dimensional table. This retrieval method, as explained with reference to the words beginning with the letter "C" as shown in Table 5a and Table 5b, works with 1,006 entries of words having "C" in the initial position and composed of seven letters, similarly 1,154 word entries having "C" in the initial position and composed of eight letters, and as many as 1,092 word entries having "C" in the initial position and composed of nine letters, with the result that a retrieval of the word, "COMPANY," for example, is performed at least 1,006 times (503 times in the case of such a retrieval by the dichotomizing search method) during comparing and referring operations of the two-dimensional table. Furthermore, in regard to the retrieval of words from a dictionary of European language words which are classified merely by their order based on the initial letters, more frequent comparing and referring operations are performed.

However, in the spelling checks of the dictionary of the European language words for the character processing system described above, the processing speed for retrieval is very slow, so that the system is not adequately usable for any real-time processing of words with a typewriter or the like. Another available method is found in increasing the processing speed by turning words into hash codes, however, in consideration of the correcting function (for correcting misspelling), which is required immediately after the realization of the spelling check function, a dictionary employing hash codes presents a problem in that it has a low degree of accuracy because the dictionary is not capable of reproducing the original array of letters.

Furthermore, it has not yet been established in the current state of the art how the word data should be edited in a dictionary of words for European language writings, in spite of the fact that the volume of the capacity of the dictionary and the efficiency of retrieval are influenced by the specific method of editing the word data.

This is due to the fact that the word data are composed of a large number of items, and additionally, that peculiar relations exist among word data since such data contain many changes in form, including plural forms and conjugated forms for example. This reflects in a failure to readily attain a reduction of the capacity of the dictionary without decline in the efficiency of retrieval although the shift code method, the compact code method, and the Huffman code method have hitherto been known as methods of storing data with high efficiency in a data base (Information Processing Society of Japan; The 18th General Meeting (1977), Lecture Summary pp 65–66 and The 19th General Meeting (1978), Lecture Summary pp 855–856).

SUMMARY OF THE INVENTION

This invention provides a character processing system with a spelling check function comprising:

input means for inputting character information and various types of instructions;

storage means for storing the said character information in a state permitting its reading;

display means for displaying the said character information and the said various types of instructions;

control means for storing the said character information input by the said input means in the said storage means and outputting the said character information to the said display means;

condensed dictionary storage means comprising a dictionary proper and an index section, the dictionary proper being composed of blocks, the blocks set up as the units of the dictionary proper and formed by dividing the dictionary proper every n-bytes, with the first word of the block being stored in one such block in the form of a string of noncondensed characters in bytes, as the unit thereof as converted into the prescribed code, and also, with the words related to the first word and subsequent thereto, including the second word, being stored in such a block, the state of information of the condensed relative code expressing a common part with the word stored one location ahead of the word which is the object, and with the noncondensed codes not transformable into the relative condensed codes being replaced with Huffman codes allocated in consideration of the frequency of occurrence and with the index section being composed of offsets derived from the dictionary proper mentioned above and with the number of blocks in a group as shown by the offsets thereof;

and spelling check means for performing a dichotomizing search, with the block as the unit, with regard to the first word in the block, by computing from the initial two letters of the keyword the address where the index information of the above-mentioned condensed dictionary storage means is stored and by taking out the offset and block number of the index when the spelling check instructions are being input from the input means mentioned above.

An object of this invention is to provide a character processing system capable of increasing the processing speed for performing spelling checks on words by reducing the storage capacity of the dictionary by re-editing the frequencies of occurrence of words into Huffman codes and by dividing the words into blocks.

According to this invention, instructions given by the input means for a spelling check will set the processing system into computing the address for the storage of the index information on the basis of the initial two letters of the keyword, taking out the offset and block number of the index, then performing a dichotomizing search of the initial first word in the beginning of the block of the dictionary proper by a searching operation on the block as the system, finding in which block of the dictionary proper the keyword is stored, selecting the block, and decoding the Huffman codes in regular sequence from the first part of the block so selected, and thereby retrieving the keyword.

This invention has made it possible to increase the retrieving speed on the occasion of a spelling check by virtue of a reduction of the storage capacity of the European language word dictionary used for the spelling check since the system has edited the frequency of occurrence of words into the Huffman codes and also keeps the words as divided in the blocks.

DESCRIPTION OF THE DRAWINGS

The present invention will become more fully understood from the detailed description given hereinbelow and the accompanying drawings which are given by way of illustration only, and thus, are not limitative of the present invention, and wherein:

FIG. 4 is an illustrative drawing showing the relative condensation of words in the present invention;

FIG. 5 is an illustrative drawing showing the formation of blocks in the dictionary of the present invention;

DESCRIPTION OF THE PREFERRED EMBODIMENTS

Figure 1:
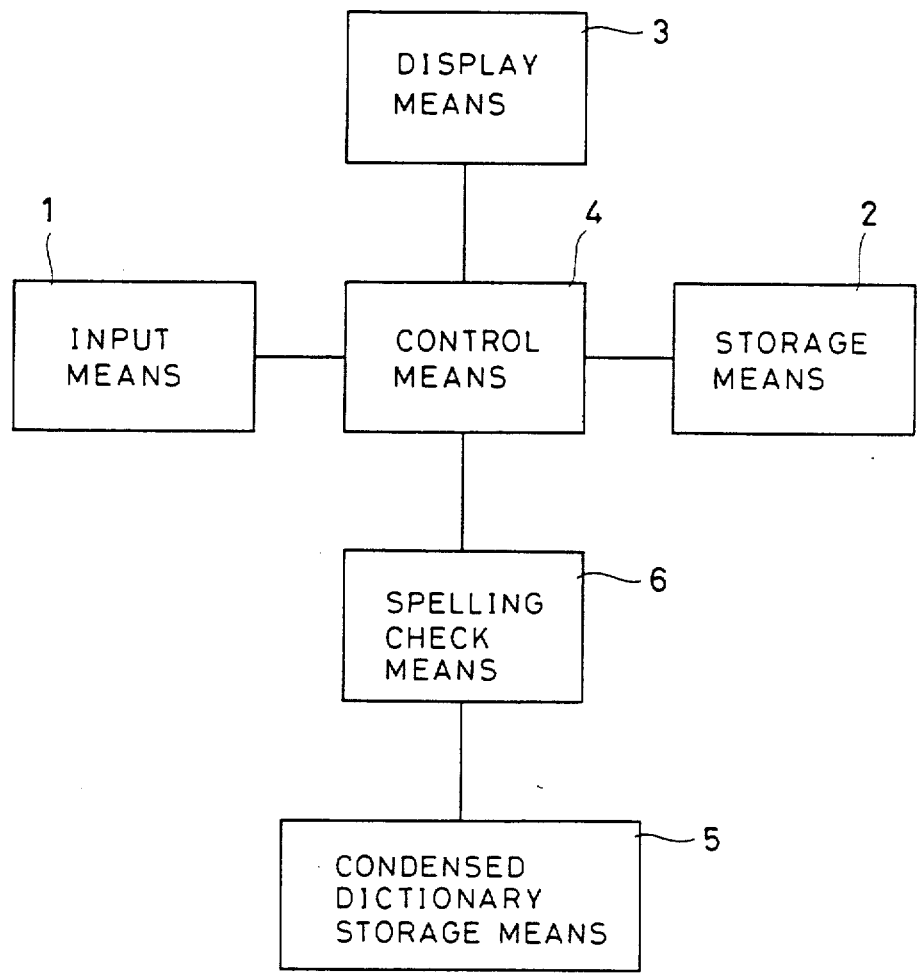
FIG. 1 is a block diagram showing the basic construction of the character processing system including a spelling check function as proposed in the present invention.

In FIG. 1, element 1 represents input means for inputting character information and various types of instructions, element 2 represents shows storage means for storing the aforementioned character information in a state permitting its reading, element 3 represents shows display means for displaying thereon the character information and the various types of instructions, and element 4 represents shows control means for storing the character information input from the input means 1 into the storage means 2 and for outputting the same to the display means 3. Element 5 represents condensed dictionary means which is composed of a dictionary proper and an index section. The dictionary proper is constructed with blocks divided with every n-bytes as the unit, and one such block stores therein the first word in the initial part of the block in the form of a noncondensed character string as the unit as converted into the prescribed code, with the words related to the first word and subsequent thereto, including the second word, being stored in the state of information in condensed relative code expressing a common part with the word stored one location ahead of the word which is the object, with the noncondensed codes not transformable into the relative condensed codes being replaced with Huffman codes as allocated in consideration of the frequency of their occurrence. The index section is composed of offsets derived from the dictionary proper mentioned above and the number of blocks in a group as shown by the offsets. Element 6 represents a spelling check means which performs a dichotomizing search, block by block with regard to the first word in the block, computing from the initial two letters of the keyword the address where the index information of the condensed dictionary storage means 5 is stored as indicated by the offset which indicates the number of bytes from an original position the block of codes for the given two letters of the keyword is located, and the block number as stored in the index when the spelling check instructions are being input from the input means 1 mentioned above.

Of the character processing system provided with a spelling check function and having a construction as described herein-above, an embodiment of this invention is explained in the following.

Figure 2:
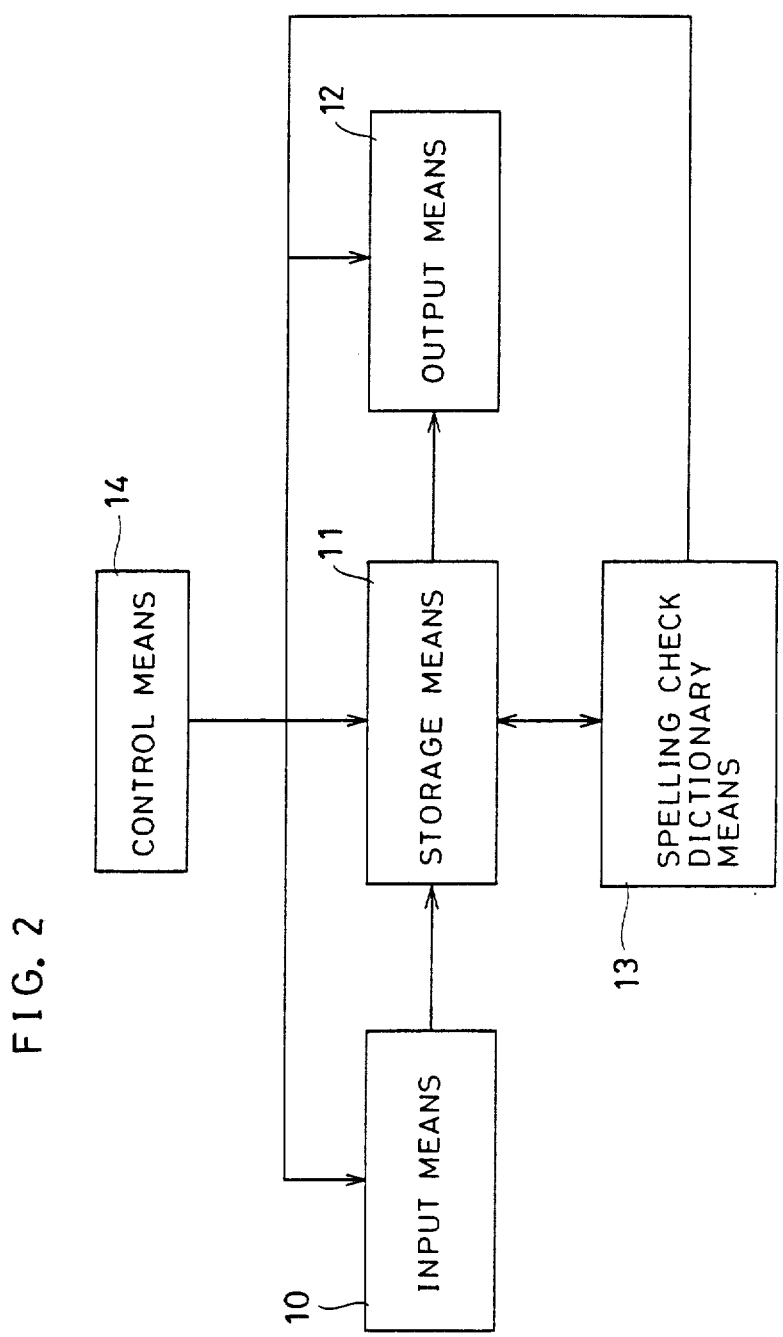
FIG. 2 is a block diagram illustrating the construction of one example of an embodiment of the present invention.

FIG. 2 is a block diagram showing the construction of the embodiment. In this Figure, element 10 represents an input apparatus employed for the input of word information, and this apparatus consists, for example, of a keyboard, a tablet device, an optical character reader, a magnetic tape device, or the like. In the event that a keyboard is employed as the input apparatus, the role of a spelling check key for giving instructions for a spelling check is allocated to any of the character input keys. Block 11 represents a storage device for storing the character information input from the input apparatus 10, and the storage device consists, for example, of a core memory, an IC memory, a magnetic disk, or the like. Block 12 represents an output apparatus which outputs the information stored in memory and edited in the storage device 11. Block 13 represents a spelling check dictionary apparatus which furnishes effective information from time to time as appropriate in response to inquiries into spelling information on the character and word data stored in the storage device 2, and this dictionary apparatus consists, for example, of a core memory, an IC memory, a RAM, or a magnetic disk. Block 14 represents a control apparatus, which controls the exchanges of signals among the various individual apparatuses forming the construction mentioned above, and is composed, for example, of a computer and executes the functions of the spelling check means.

Next, a detailed description is given with respect to the spelling check dictionary apparatus, which constitutes a characteristic part of any embodiment of this invention.

Figure 3:
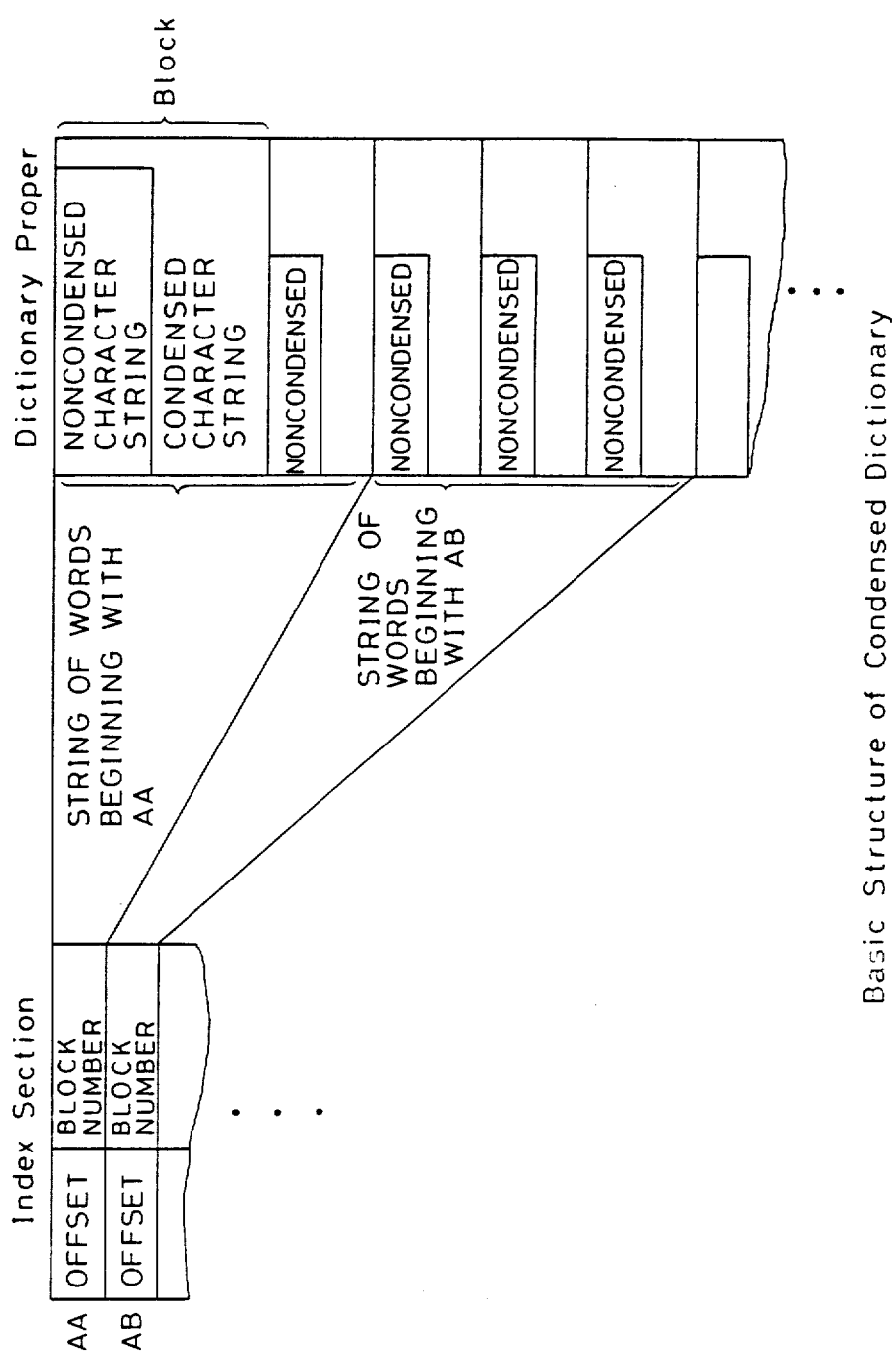
FIG. 3 is an illustrative drawing showing the construction of the condensed dictionary of the present invention.

FIG. 3 shows the fundamental structure of a condensed dictionary, which has a condensed dictionary capacity, for use as the spelling check dictionary means. As shown in this Figure, the condensed dictionary is composed of an index section and the dictionary proper. The index section consists of offsets derived from the initial part of the dictionary proper which indicate where in the dictionary proper a string of words beginning with the two initial letters XX is stored and the number of blocks which are accommodated in the dictionary proper. The dictionary proper, as shown in FIG. 5, is composed of blocks, as the units thereof, which are divided for every n-bytes, and the first word in the beginning of each block is contained in the form of a string of noncondensed characters in bytes as the unit as converted into the internal code. The second and any subsequent words in each block are stored in the form of a relative condensed code (i.e. a code representing the common part of an immediately preceding word) and in the form of a Huffman cod replacing the noncondensed character code not subjectable to relative condensation as allocated on the basis of the frequencies of occurrence of such character codes.

Accordingly, if the word string beginning with XX exceeds the n-bytes, which is the length of a block, then a plural number of blocks are present within one and the same index. For performing any spelling check in such a case, the address at which the index information is stored is to be computed on the basis of the initial two letters in the keyword, and the offsets of the index and the block number thereof are to be recalled from memory and utilized. Then, as the offset, the block number, and the block length n are known, a dichotomizing search is performed with the block as the unit with respect to the noncondensed word in the above-mentioned initial part of the block. Now that it is possible to find out, in what block the keyword is stored, the keyword is retrieved by decoding the Huffman codes one by one in regular sequence from the initial part of the block which is the object of the retrieval.

Types of Characters Handled

The system of the present invention can handle 64 types of characters comprising &, ', 0–9, A - Z, a - z. However, "-" has a special meaning when it is used in hyphenation

Dictionary

The source dictionary subjected to condensation is an English language word dictionary in which such morphologically changed forms as the inflected forms of nouns and the conjugated forms of verbs are recorded on the assumption that they are utterly different words from their root forms. Moreover, although in the English word dictionary, a word of one letter in length, such as "a", "&", ", (comma)", or numerals exists, such single letter words are ignored and not stored, while two or more letters are stored.

Basic Algorithm for Condensation

An English word dictionary will offer very close correlations to the neighboring words if it is made to perform sorting in the ASCII code sequence (i.e. in the order of the character codes). That is to say, a large number of letters in duplication occur more frequently in the beginning parts of words, and, through utilization of this noticed feature, it is possible to condense a dictionary by the method consisting in replacing the overlapping character strings with special codes. (Refer to FIG. 4.)

However, if such condensation is performed by this method, it is required in the process of a retrieval of an item in the dictionary to perform the retrieving operation in regular sequence from the beginning of the dictionary, and, in the worst case, the retrieving operation will be carried through the entirety of the dictionary from its beginning to its end even on the occasion of a spelling check performed on a word not recorded in the dictionary. Therefore, if the dictionary is divided into blocks each having a certain value of length (block length), i.e. n-bytes, with the first word in the block not subjected to relative condensation, it is possible to apply the dichotomizing search method, with the block as the unit, to the character strings not subjected to this relative condensation. (Refer to FIG. 5.) Accordingly, the retrieval of any entry in the dictionary is to be performed by the three steps described in the following.

(i) On the basis of the index value for the keyword, index information on such items as the offset and the block number is to be obtained from the index table.

(ii) A dichotomizing search is performed with the block as the unit on the basis of the offset, the block number, and the block length n (which are obtained by the step described in i), and the block in which the keyword is considered to be stored should be specifically identified.

(iii) Only with respect to the block specified (by the step described in ii), retrieving operation is to be performed in regular sequence from the beginning of the block.

Retrieval of a given entry in the dictionary by the method described above will limit the range requiring any sequential retrieval to the block length n in the worst case, so that it is possible to achieve a higher speed retrieving operation resulting in a shorter period of time required for any retrieval on the occasion of a spelling check.

With this method being employed as the basic framework for the condensation of the dictionary and the retrieving operations in the dictionary, and, for further condensation, the Huffman coding method described later has been utilized to perform the condensation of the codes for the second and subsequent words in each code.

Therefore, the capacity of the dictionary so condensed by the procedures described above and the resulting average retrieval time for the spelling check operation will vary, depending on the block length n and the composition of the index described later, i.e. how many letters in the initial parts of the words are used to form the index. Consequently, several pairs of these two parameters are selected, and such parameters are used in actually performing the condensation of the dictionary and the retrieving operations in the dictionary. The parameters with which it is possible to obtain the capacity and operating speed suitable for the purpose are determined by examining the relationship between the capacity of the condensed dictionary and the average retrieving speed in the dictionary.

Index Section

As mentioned above, the types of characters handled in this dictionary is 64. Accordingly, if the initial m-number of letters is to be used as the index the $64^m$ pieces of index tables should be prepared, i.e. $64^1 = 64$ pieces if the initial one letter is used as the index, $64^2 = 4,096$ pieces if the initial two letters are used as the index, $64^3 = 262,144$ pieces if the initial three letters are used as the index.

However, the number of m is to be limited to two or less because words each consisting of two letters in word length are recorded in the dictionary and also because any larger value of the m would result in an increase of the capacity of the index section by an exponential function, with greater complexity developing in the structure of the dictionary if the index is composed of the initial three letters or more. Moreover, with a larger value for m, the index can be narrowed down, with the result that the speed for the spelling check will be higher. With these points being taken into consideration, experiments were conducted with respect to the cases with m=1 and m=2 and, in light of the results obtained therefrom, it has been decided to employ m=2 for optimizing the relationship between the capacity of the condensed dictionary and the speed for spelling checks.

In regard to the method of reference to the index tables, the keywords are converted into internal codes on the basis of the internal code conversion table shown in Table 1, and index values in the range of 0–4,095 are formed with a weight of 64 placed on the first letter.

With reference to this value (&&=0, &'=1, ......, AA=80), the necessary index information is obtained by computing the address in the index table.

There are three types of the index information; one of them is the value of the offset from the initial part of the dictionary proper in which the word string belonging to that index is stored, and the second is the number of the blocks stored in the particular index while the third is a flag indicating whether or not there is any word of two-letter length in the index since there are words with the length of two letters in the dictionary (For instance, the flag will be "on" if there is any word AB in the two-letter length in the index AB). Actually, the index information section has the construction shown in FIG. 4, and the index table is composed of 4,096 pieces of such information like this, each of which is in correspondence to the index (value) in the range of 0–4,095.

Figure 6:
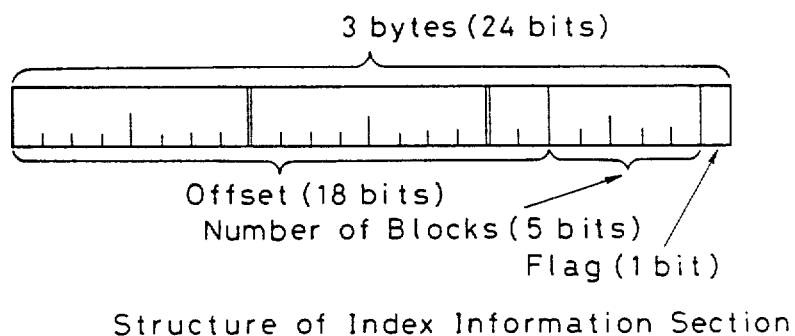
FIG. 6 is a schematic drawing showing the construction of the index information section of the present invention.

To give some additional explanations concerning FIG. 6, the offset, being composed of 18 bits, is capable of expressing $2^{18}-1=262,143$ as the maximum, but the offset value will not exceed this value in the method of condensation adopted at this time. Moreover, the number of blocks will be $2^5-1=31$ at the maximum for five bits, and yet, as the result of an actual condensation, it is observed that the number of blocks will not be in excess of 31 in the dictionary as it is at present if the block length n is approximately 256 bytes or more. Consequently, caution is needed in any of such cases as an alteration made of the source dictionary, the setting of a block length n at a value less than 256, or any change made of the dictionary structure.

When the index section is constructed in this manner, the capacity of the index section will be 4,096×3=12,288 bytes. With a dictionary having an index section of this construction, it is possible promptly to judge the presence or absence of the pertinent word without any retrieval operation in the dictionary proper only in any of the two special cases described in the following.

(i) In the case that number of blocks for the index information indicated by the index value of the keyword is zero, there is no word recorded under that index. In other words, the key word is not recorded in the dictionary.

(ii) In the case that the key word is any word composed of two letters in length, the pertinent word is recorded in the dictionary if the flag is found to be "on" for the index information indicated by the index value. Moreover, the word is not recorded if the flag is "off".

Dictionary Proper

Figure 7:
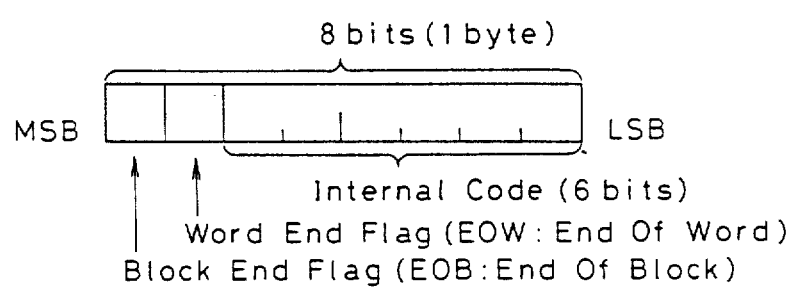
FIG. 7 is a schematic drawing showing the construction of the code column for the first word in the initial part of the present invention.

The dictionary proper, which is a collection of words excluding the initial two letters used for the index, has a construction made up of blocks as its basic units, and the initial part of each block always forms a byte boundary. Furthermore, the first word in the initial part of each block is a string of codes, with bytes as the unit, with the addition of a flag to an internal code, illustrated in FIG. 7, for the purpose of performing a dichotomizing search for the word in the block (Refer to Table 1). Consequently, the first word in the initial part of the block is a string of codes before the flag EOW (End of Word) or EOB (End of Block) is set up, and, if the flag EOB is "on," it is to be understood that there is no longer any word recorded in the block. Therefore, such a string of codes can be easily restored into internal code by masking the two bits in the upper positions. Also, as the internal codes contain an arrangement of the corresponding ASCII code values in the positive order, it is possible to make a comparison thereof with the keyword only by a simple deduction.

Figures 8, 9:
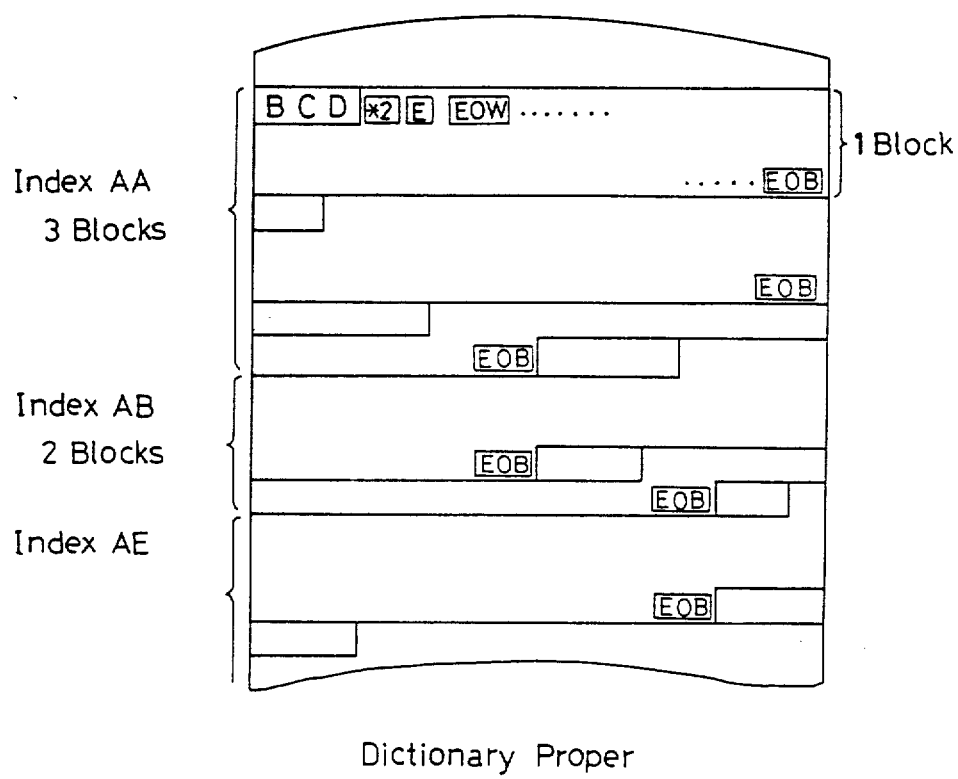
FIG. 8 is an illustrative drawing showing the condensed relative condensed code of the present invention.
FIG. 9 is a schematic drawing showing the construction of the dictionary proper of the present invention.

The second word and the subsequent words in the block are composed of the 64 types of characters mentioned above, the condensed relative codes, and the Huffman codes corresponding to EOW and EOB. The condensed relative code is a code which shows the length of the common part of a word shared with the immediately preceding word as counted from the initial letter, and, as it is not necessary to use any condensed relative code if the common part left after the deletion of the initial two letters for the index is one letter, the relative coding is applied in case there is a common part consisting of two or more letters (Refer to FIG. 8). In FIG. 8, the individual codes are represented for convenience in such forms as *4 and EOW, but actually these codes are recorded in the Huffman code. The coding and condensation of strings of words are performed in this manner, and yet there is the possibility that the capacity exceeds the block length n in the process of the coding of the strings of words belonging to one index (for example, the words beginning with AA for the index AA). In such a case, the word which is stored in excess of the block length n is treated as the first word in the initial part of the next block (i.e. without relative condensation or Huffman coding) in order to make it possible to conduct a dichotomizing search, and the EOB code is stored as the end of the block. The initial part of the next block is surely to be set at the value which corresponds to the sum obtained from the addition of an integral number of times of the block length n to the value of the offset of the index. Now that there is consequently a plural number of blocks in such an index, it is possible to try to apply the dichotomizing search method with the block as the unit and with the first word in the initial part of each block in the index since the offset, block number, and block length n are already known. As the implementation of the dichotomizing search method makes it possible to specify the block which is considered to contain a keyword, it will be sufficient to perform the search in regular sequence by decoding the Huffman code only with respect to the particular block. However, since it is possible to make an erroneous development of the Huffman code in the process of the search if the keyword on which a spelling check is to be conducted is any keyword not recorded in the dictionary, it is to be done unfailingly to record EOB instead of EOW. By this arrangement, a search is to be discontinued in the case that the keyword cannot be found even though the EOB code has been detected at the time when the Huffman code is developed (i.e. when a search is conducted within the block) because the keyword is not recorded in the dictionary in such a case.

The construction of the dictionary described in the foregoing part is illustrated in FIG. 9.

Generation of the Huffman Code

For the use of the Huffman code, condensation by the Huffman coding method is effective because the English word dictionary, which provides the data to be condensed, is already known.

For the allocation of the Huffman code, it is necessary to find the frequency of occurrence of each code, but there is a contradiction in that, in order to develop the data needed for the purpose, complete condensation can be accomplished only after the Huffman code is decided (because the Huffman code constitutes a variable length bit string with relative condensation being applied to the condensation of the dictionary) and the frequency of occurrence can be determined only after the Huffman code is decided. In actual practice, therefore, the condensation is performed on the assumption that the code length of the Huffman in correspondence to the coding is composed of eight bits in all cases by taking as the basis the frequency of occurrence of each code together with the condensed relative codes, the noncondensed characters that could not be subjected to the relative condensation, the EOW, which is a separator code between words, and the EOB, which is the block completion code. (Refer to Table 2 and Table 3).

Accordingly, while the frequencies of occurrence and the probabilities of occurrence given in Table 2 are not precise, those values, as viewed from the statistical standpoint, will not be remote from the real values. Hence, the Huffman code was generated on the basis of these data. However, in the case that the code length of the Huffman code turned out to be in excess of eight bits, greater complexity developed in the process for the decoding of the Huffman code. Thus in order to prevent the conversion table from expanding into an enormous capacity in consequence of the decoding method described later, the maximum word length was limited to eight bits. Therefore, the maximum word length of the generated Huffman code was kept to eight bits by allocating a special Huffman code called "other" to cover all the codes with relatively low frequencies of occurrence put together. This "other" code is expanded in the form of an addition of a six-bit character code to the Huffman code corresponding to "other". Therefore, this code system is not a pure Huffman code, but a modified Huffman code. The Huffman code conversion table is presented in Table 4.

Algorithm for decoding the Huffman code

For any actual spelling check, it is necessary to perform the process of decoding the condensed dictionary, and yet, since the Huffman code is a variable length bit string, a complicated way of processing is involved in the decoding of the code. For example, it will cause a considerable loss of time required for the decoding process, and consequently will not serve the purpose of any spelling check, to perform the decoding process by taking out the data contained in the dictionary bit by bit, making the pattern-matching of the data with the Huffman code, taking out one more bit for making a one-bit shift if the patterns do not match, and making the pattern-matching again with a key put in, repeating this procedure until the key matches with the Huffman code.

Therefore, the data in the dictionary are taken out in a unit of eight bits, the eight-bit data being regarded as representing a value in the range of 0–255, and the bit length actually effective as the Huffman code and the internal code allocated to that Huffman code are to be obtained out of the sixteen-bit data taken from reference to the table. The Huffman code is decoded by the procedure consisting in advancing the reading point for the dictionary by the effective bit length in preparation for the next decoding operation. In such a decoding process, the processing speed needed for the development of the Huffman code will be high but, on the other hand, the process requires an area for the reference table. The modified Huffman code adopted at this time is designed in such a way that the maximum bit length for the code will be eight bits. Accordingly, the capacity of the reference table will be $2^8 \times 2$ bytes = 512 bytes (The two bytes are used as the area for storing the information on the effective bit length [3-bits] and the corresponding internal code [8 bits]). However, when the Huffman code corresponding to the "other" code is developed, it is necessary further to obtain a six-bit extension code from the dictionary and to convert this extension code into an internal code with reference to the conversion table. The capacity of the conversion table for this purpose is 49 bytes, i.e. the number of codes allocated to the extension code.

Figure 10A:
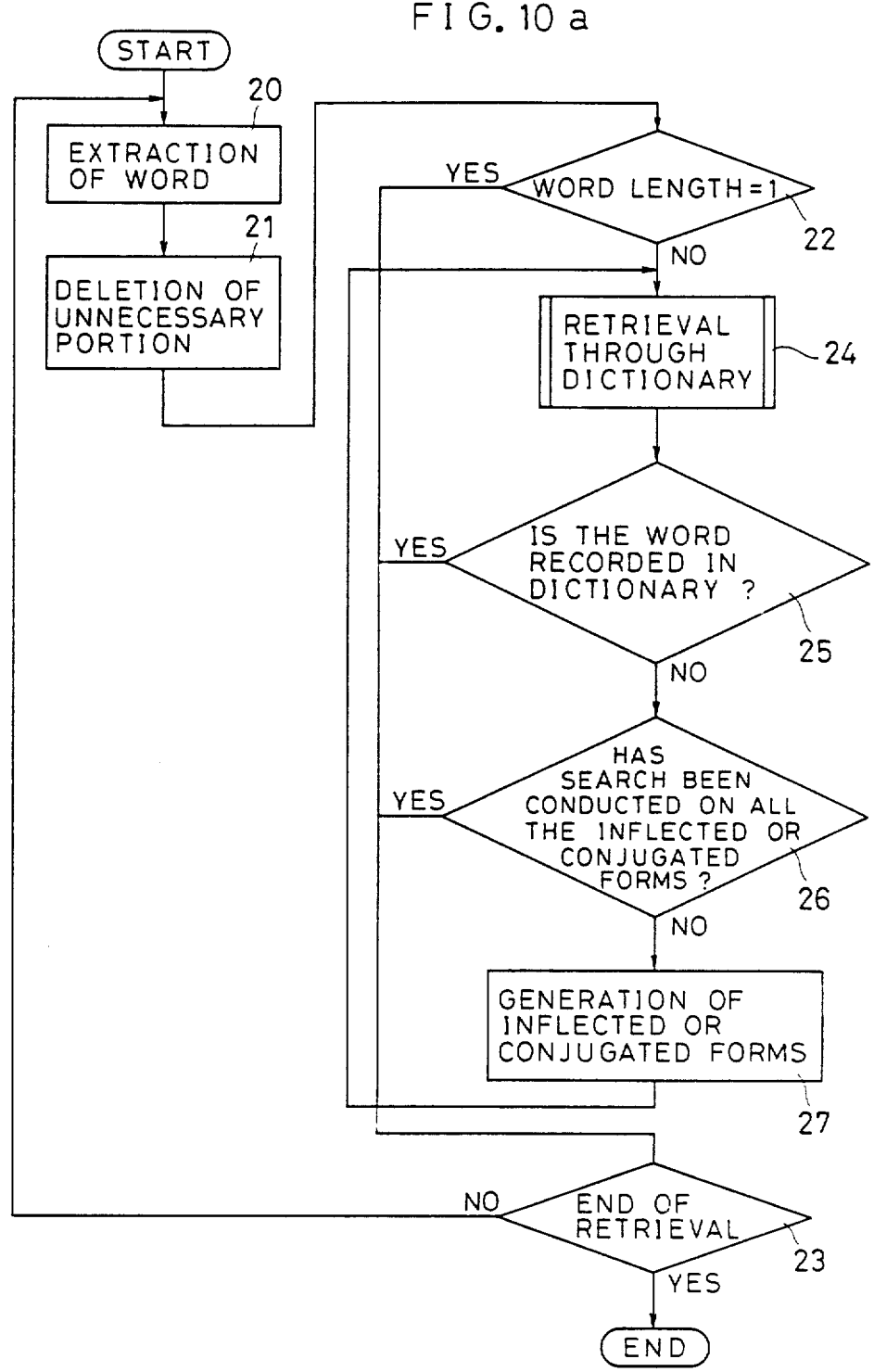
FIG. 10a, 10b and 10c are flow charts describing the operation of an embodiment of the present invention.

Next, the dictionary retrieval function in this embodiment is explained with reference to the flow charts given in FIG. 10a, 10b and FIG. 10c.

First, a word is extracted by cutting out the word from the character string input from a file or from the input apparatus (Step 20). Then, the unnecessary characters annexed to a word are deleted (XXX' is changed to XXX, and XXX's is changed to XXX) (Step 21). The length of the searched word (hereinafter referred to as the "keyword") is judged (Step 22), and, if the length of the word in one letter, the search in the dictionary is not performed, and the searching operation is brought to a close (Step 23). In the case that the length of the word is not one letter, a search in the dictionary is started (Step 24), and it is judged whether or not the keyword is recorded in the dictionary (Step 25), and, if it is not recorded, a searching operation is performed with respect to all the inflected forms and conjugated forms of the base word, and the search is brought to an end if the word thus searched is not present (Step 26 and Step 23). In the case that a search has not been completed with regard to all the inflected forms and conjugated forms (Step 26), a generation of such forms (i.e. inflected or conjugated forms such as Abc or abc for ABC) is performed (Step 27), and a search in the dictionary is performed again.

Figure 10B:
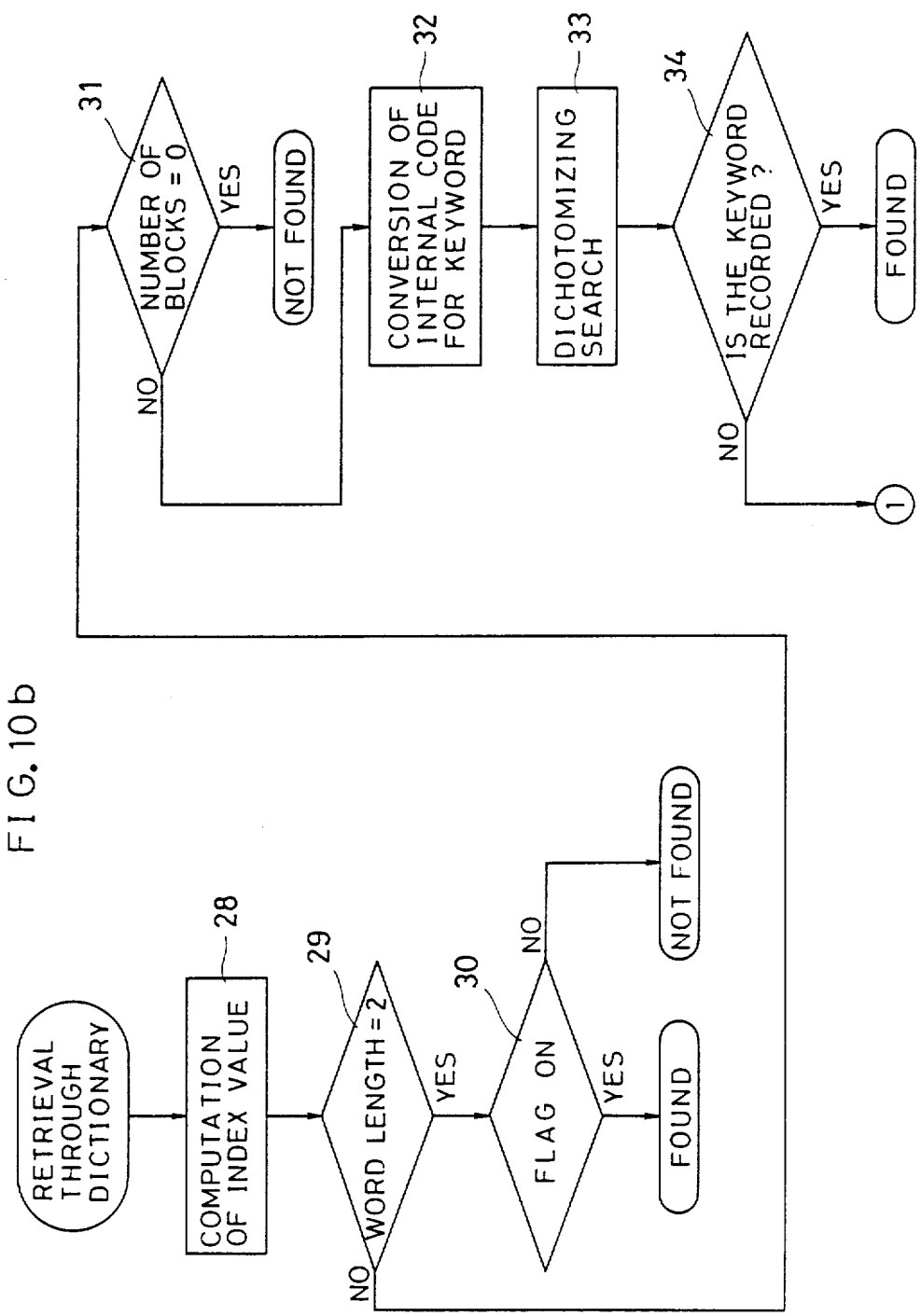
Figure 10C:
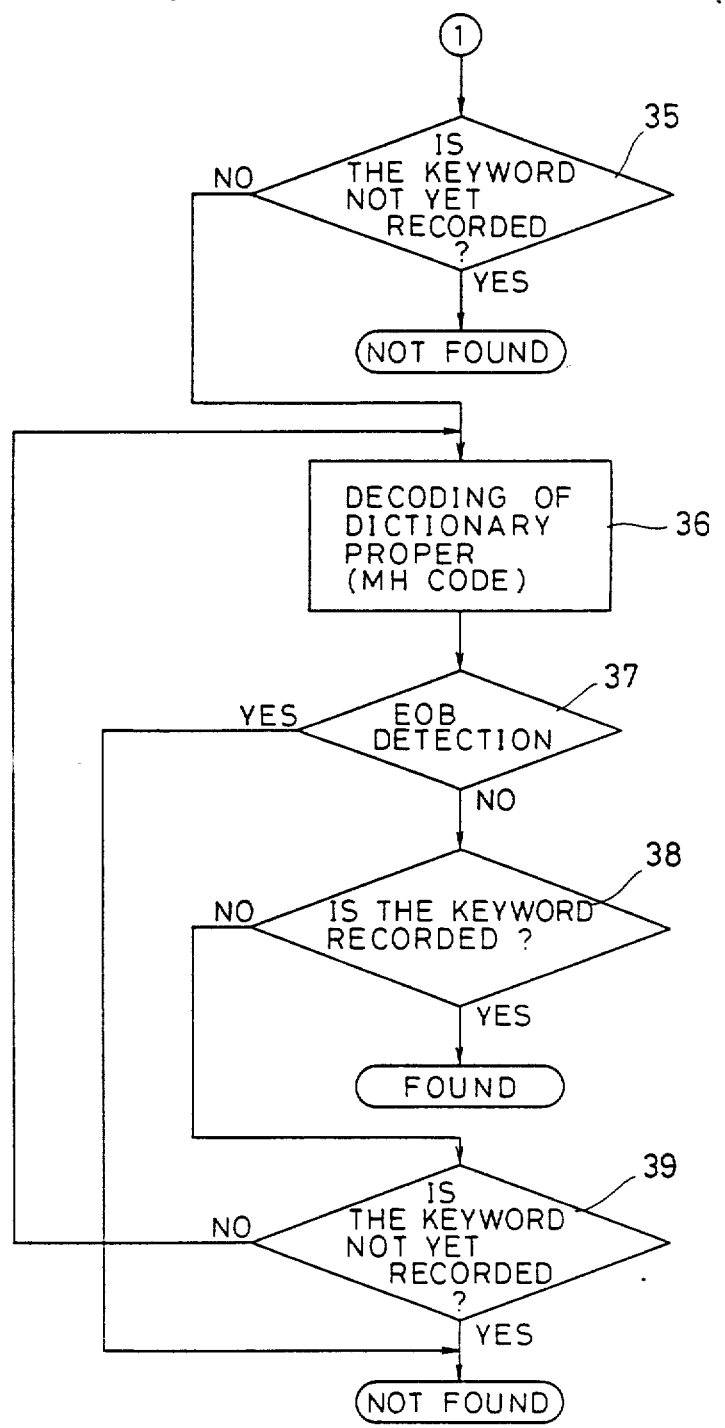

An explanation is now given here with respect to the process of a search in the dictionary as shown in FIG. 10b. First, the value of the index is computed on the basis of the initial two letters in the keyword (Step 28). Then, the two initial letters are deleted from the keyword. It is judged whether the word length is two letters (Step 29), and, in the case that the word length is two letters, it is possible to judge, by checking the two-letter word record flag in the relevant index (Step 30), whether the word searched is recorded or not. Since the storage block number "0" for the relevant index indicates that there is no word stored in the index (Step 31), accordingly the search is to be ended. In case the block number is not "0", then the keyword is converted into an internal code for the purpose of conducting a search in the dictionary proper (Step 32), and a dichotomizing search, with the block as the unit, is conducted as the first stage of the search operation (Step 33). At the stage when the dichotomizing search has been conducted, it is judged whether the keyword has been found, i.e. whether the keyword is recorded (Step 34), and, if the keyword is not recorded, it is judged that the same is not yet recorded (Step 35), as shown in FIG. 10c. Also, a comparison of the keyword with the words in the dictionary in terms of size in the course of a search makes it possible to judge that any subsequent search would not find the word as it is not recorded (since the dictionary records words in the ASCII sequence). Thereafter, the second-stage search is conducted for a sequential search of the condensed dictionary. The words are taken out one by one from the condensed dictionary proper (the modified Huffman code) and the words so taken out are converted into internal codes for the purpose of their comparison with the keyword (Step 36). In case any EOB is detected (Step 37), the search is ended because no more words are recorded, and, in case the EOB is not detected, it is judged whether any keyword is recorded (Step 38), and, if no keyword is recorded, it is judged that the keyword is not yet recorded (Step 39), and the search is brought to an end if the keyword is not yet recorded, but, if it is not judged that the keyword is not yet recorded, the searching operation is taken back to Step 36.

Results

A spelling check was performed with a dictionary which records 77,240 words, and the average speed for the spelling check per word was 69 msec/word for a block length n=256 bytes. Also, the capacity for the condensation of the dictionary was approximately 182 KB for the dictionary proper and approximately 195 XB including the capacity needed for the index and the conversion table, and it became possible to operate within 2 M-bits including the capacity for the spelling check program. Furthermore, in order to increase this processing speed any further, condensation is to be performed with the byte as the unit, instead of the bit arithmetic operation attending the decoding of the Huffman code. The searching speed so achievable is approximately 27 msec/word for a block length n=256 bytes.

It is up to the user's discretion to choose the former or the latter in any given environment.

In regard to this embodiment, moreover, description of the process in which instructions for a spelling check is issued by the input apparatus 10 and description of the process in which the contents of the spelling check dictionary 13 are retrieved by way of the controlling apparatus 14, are omitted since the processes are the same as what is employed in the conventional system. The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

TABLE 1

| INTERNAL CODE CONVERSION TABLE | |
| --- | --- |
| CHARACTER | INTERNAL CODE |
| & | 0 |
| ' | 1 |
| 0 | 2 |
| 1 | 3 |
| 2 | 4 |
| 3 | 5 |
| 4 | 6 |
| 5 | 7 |
| 6 | 8 |
| 7 | 9 |
| 8 | 10 |
| 9 | 11 |
| A | 12 |
| B | 13 |
| C | 14 |
| D | 15 |
| E | 16 |
| F | 17 |
| G | 18 |
| H | 19 |
| I | 20 |
| J | 21 |
| K | 22 |
| L | 23 |
| M | 24 |
| N | 25 |
| O | 26 |
| P | 27 |
| Q | 28 |
| R | 29 |
| S | 30 |
| T | 31 |
| U | 32 |
| V | 33 |
| W | 34 |
| X | 35 |
| Y | 36 |
| Z | 37 |
| a | 38 |
| b | 39 |
| c | 40 |
| d | 41 |
| e | 42 |
| f | 43 |
| g | 44 |
| h | 45 |
| i | 46 |
| j | 47 |
| k | 48 |
| l | 49 |
| m | 50 |
| n | 51 |
| o | 52 |
| p | 53 |
| q | 54 |
| r | 55 |
| s | 56 |
| t | 57 |
| u | 58 |
| v | 59 |
| w | 60 |
| x | 61 |
| y | 62 |
| z | 63 |

| FREQUENCY OF OCCURRENCE OF EACH CODE | | | |
| --- | --- | --- | --- |
| INTERNAL CODE | CODE | FREQUENCY OF OCCURRENCE | PROBABILITY OF OCCURRENCE |
| 0 | & | 0 | 0.00000 |
| 1 | ' | 60 | 0.00018 |
| 2 | 0 | 0 | 0.00000 |
| 3 | 1 | 0 | 0.00000 |
| 4 | 2 | 0 | 0.00000 |
| 5 | 3 | 0 | 0.00000 |
| 6 | 4 | 0 | 0.00000 |

FREQUENCY OF OCCURRENCE OF EACH CODE

| INTERNAL CODE | CODE | FREQUENCY OF OCCURRENCE | PROBABILITY OF OCCURRENCE |
|---|---|---|---|
| 7 | 5 | 0 | 0.00000 |
| 8 | 6 | 0 | 0.00000 |
| 9 | 7 | 0 | 0.00000 |
| 10 | 8 | 0 | 0.00000 |
| 11 | 9 | 0 | 0.00000 |
| 12 | A | 43 | 0.00013 |
| 13 | B | 11 | 0.00003 |
| 14 | C | 39 | 0.00011 |
| 15 | D | 14 | 0.00004 |
| 16 | E | 9 | 0.00003 |
| 17 | F | 8 | 0.00002 |
| 18 | G | 8 | 0.00002 |
| 19 | H | 4 | 0.00001 |
| 20 | I | 10 | 0.00003 |
| 21 | J | 0 | 0.00000 |
| 22 | K | 9 | 0.00003 |
| 23 | L | 7 | 0.00002 |
| 24 | M | 12 | 0.00004 |
| 25 | N | 3 | 0.00001 |
| 26 | O | 25 | 0.00007 |
| 27 | P | 14 | 0.00004 |
| 28 | Q | 1 | 0.00000 |
| 29 | R | 10 | 0.00003 |
| 30 | S | 18 | 0.00005 |
| 31 | T | 25 | 0.00007 |
| 32 | U | 5 | 0.00001 |
| 33 | V | 9 | 0.00003 |
| 34 | W | 6 | 0.00002 |
| 35 | X | 2 | 0.00001 |
| 36 | Y | 1 | 0.00000 |
| 37 | Z | 1 | 0.00000 |
| 38 | a | 10530 | 0.03096 |
| 39 | b | 2457 | 0.00722 |
| 40 | c | 4907 | 0.01443 |
| 41 | d | 9944 | 0.02924 |
| 42 | e | 23735 | 0.06978 |
| 43 | f | 1282 | 0.00377 |
| 44 | g | 9080 | 0.07670 |
| 45 | h | 2832 | 0.00833 |
| 46 | i | 17889 | 0.05259 |
| 47 | j | 121 | 0.00036 |
| 48 | k | 1482 | 0.00436 |
| 49 | l | 10939 | 0.03216 |
| 50 | m | 3694 | 0.01086 |
| 51 | n | 17477 | 0.05138 |
| 52 | o | 8797 | 0.02586 |
| 53 | p | 2420 | 0.00711 |
| 54 | q | 161 | 0.00047 |
| 55 | r | 10588 | 0.03113 |
| 56 | s | 30490 | 0.08964 |
| 57 | t | 11631 | 0.03419 |
| 58 | u | 4075 | 0.01198 |
| 59 | v | 1299 | 0.00382 |
| 60 | w | 1139 | 0.00335 |
| 61 | x | 350 | 0.00103 |
| 62 | y | 7647 | 0.02248 |
| 63 | z | 682 | 0.00201 |
|  | EOW | 77240 | 0.22708 |
|  | EOB | 1545 | 0.00454 |
|  | *00 | 12069 | 0.03548 |
|  | *01 | 11936 | 0.03509 |
|  | *02 | 11266 | 0.03312 |
|  | *03 | 9498 | 0.02792 |
|  | *04 | 7334 | 0.02156 |
|  | *05 | 5688 | 0.01672 |
|  | *06 | 3660 | 0.01076 |
|  | *07 | 2079 | 0.00611 |
|  | *08 | 1035 | 0.00304 |
|  | *09 | 493 | 0.00145 |
|  | *10 | 179 | 0.00053 |
|  | *11 | 71 | 0.00021 |
|  | *12 | 29 | 0.00009 |
|  | *13 | 8 | 0.00002 |
|  | *14 | 4 | 0.00001 |
|  | *15 | 2 | 0.00001 |

*"n" denotes a condensed relative code.
*"00" indicates that the item so marked is condensed by four letters in the source word.

FREQUENCY OF OCCURRENCE OF EACH CODE
(The items are given in the table in their order as sorted from the largest in the frequency of occurrence.)

| INTERNAL CODE | CODE | FREQUENCY OF OCCURRENCE | PROBABILITY OF OCCURRENCE |
|---|---|---|---|
|  | EOW | 77240 | 0.22708 |
| 56 | s | 30490 | 0.08964 |
| 42 | e | 23735 | 0.06978 |
| 46 | i | 17889 | 0.05259 |
| 51 | n | 17477 | 0.05138 |
|  | *00 | 12069 | 0.03548 |
|  | *01 | 11936 | 0.03509 |
| 57 | t | 11631 | 0.03419 |
|  | *02 | 11266 | 0.03312 |
| 49 | l | 10939 | 0.03216 |
| 55 | r | 10588 | 0.03113 |
| 38 | a | 10530 | 0.03096 |
| 41 | d | 9944 | 0.02924 |
|  | *03 | 9498 | 0.02792 |
| 44 | g | 9080 | 0.02670 |
| 52 | o | 8797 | 0.02586 |
| 62 | y | 7647 | 0.02248 |
|  | *04 | 7334 | 0.02156 |
|  | *05 | 5688 | 0.01672 |
| 40 | c | 4907 | 0.01443 |
| 58 | u | 4075 | 0.01198 |
| 50 | m | 3694 | 0.01086 |
|  | *06 | 3660 | 0.01076 |
| 45 | h | 2832 | 0.00833 |
| 39 | b | 2457 | 0.00722 |
| 53 | p | 2420 | 0.00711 |
|  | *07 | 2079 | 0.00611 |
|  | EOB | 1545 | 0.00454 |
| 48 | k | 1482 | 0.00436 |
| 59 | v | 1299 | 0.00382 |
| 43 | f | 1282 | 0.00377 |
| 60 | w | 1139 | 0.00335 |
|  | *08 | 1035 | 0.00304 |
| 63 | z | 682 | 0.00201 |
|  | *09 | 493 | 0.00145 |
| 61 | x | 350 | 0.00103 |
|  | *10 | 179 | 0.00053 |
| 54 | q | 161 | 0.00047 |
| 47 | j | 121 | 0.00036 |
|  | *11 | 71 | 0.00021 |
| 1 | ' | 60 | 0.00018 |
| 12 | A | 43 | 0.00013 |
| 14 | C | 39 | 0.00011 |
|  | *12 | 29 | 0.00009 |
| 31 | T | 25 | 0.00007 |
| 26 | O | 25 | 0.00007 |
| 30 | S | 18 | 0.00005 |
| 27 | P | 14 | 0.00004 |
| 15 | D | 14 | 0.00004 |
| 24 | M | 12 | 0.00004 |
| 13 | B | 11 | 0.00003 |
| 29 | R | 10 | 0.00003 |
| 20 | I | 10 | 0.00003 |
| 33 | V | 9 | 0.00003 |
| 22 | K | 9 | 0.00003 |
| 16 | E | 9 | 0.00003 |
| 18 | G | 8 | 0.00002 |
| 17 | F | 8 | 0.00002 |
|  | *13 | 8 | 0.00002 |
| 23 | L | 7 | 0.00002 |
| 34 | W | 6 | 0.00002 |

-continued

FREQUENCY OF OCCURRENCE OF EACH CODE
(The items are given in the table in their order as sorted
from the largest in the frequency of occurrence.)

| INTERNAL CODE | CODE | FREQUENCY OF OC- CURRENCE | PROBA- BILITY OF OC- CURRENCE |
|---|---|---|---|
| 32 | U | 5 | 0.00001 |
| 19 | H | 4 | 0.00001 |
|  | *14 | 4 | 0.00001 |
| 25 | N | 3 | 0.00001 |
| 35 | X | 2 | 0.00001 |
|  | *15 | 2 | 0.00001 |
| 37 | Z | 1 | 0.00000 |
| 36 | Y | 1 | 0.00000 |
| 28 | Q | 1 | 0.00000 |
| 21 | J | 0 | 0.00000 |
| 11 | 9 | 0 | 0.00000 |
| 10 | 8 | 0 | 0.00000 |
| 9 | 7 | 0 | 0.00000 |
| 8 | 6 | 0 | 0.00000 |
| 7 | 5 | 0 | 0.00000 |
| 6 | 4 | 0 | 0.00000 |
| 5 | 3 | 0 | 0.00000 |
| 4 | 2 | 0 | 0.00000 |
| 3 | 1 | 0 | 0.00000 |
| 2 | 0 | 0 | 0.00000 |
| 0 | & | 0 | 0.00000 |

*"n" denotes a condensed relative code.
*"00" indicates that the item has been condensed by four letters in the source word. In Table 3, the codes downward of Z are all put together and assigned the Huffman code, "Other". At this time, the frequency of occurrence and probability of occurrence of "Other" are 2,454 and 0.00721, respectively.

TABLE 4

CONVERSION TABLE FOR HUFFMAN CODE

| Internal Code | Code | Huffman Code |  |
|---|---|---|---|
| 0 | & | 0111110 | 000000 |
| 1 | ' | 0111110 | 000001 |
| 2 | 0 | 0111110 | 000010 |
| 3 | 1 | 0111110 | 000011 |
| 4 | 2 | 0111110 | 000100 |
| 5 | 3 | 0111110 | 000101 |
| 6 | 4 | 0111110 | 000110 |
| 7 | 5 | 0111110 | 000111 |
| 8 | 6 | 0111110 | 001000 |
| 9 | 7 | 0111110 | 001001 |
| 10 | 8 | 0111110 | 001010 |
| 11 | 9 | 0111110 | 001011 |
| 12 | A | 0111110 | 001100 |
| 13 | B | 0111110 | 001101 |
| 14 | C | 0111110 | 001110 |
| 15 | D | 0111110 | 001111 |
| 16 | E | 0111110 | 010000 |
| 17 | F | 0111110 | 010001 |
| 18 | G | 0111110 | 010010 |
| 19 | H | 0111110 | 010011 |
| 20 | I | 0111110 | 010100 |
| 21 | J | 0111110 | 010101 |
| 22 | K | 0111110 | 010110 |
| 23 | L | 0111110 | 010111 |
| 24 | M | 0111110 | 011000 |
| 25 | N | 0111110 | 011001 |
| 26 | O | 0111110 | 011010 |
| 27 | P | 0111110 | 011011 |
| 28 | Q | 0111110 | 011100 |
| 29 | R | 0111110 | 011101 |
| 30 | S | 0111110 | 011110 |
| 31 | T | 0111110 | 011111 |
| 32 | U | 0111110 | 100000 |
| 33 | V | 0111110 | 100001 |
| 34 | W | 0111110 | 100010 |
| 35 | X | 0111110 | 100011 |
| 36 | Y | 0111110 | 100100 |
| 37 | Z | 0111110 | 100101 |
| 38 | a |  | 01101 |
| 39 | b |  | 0101111 |
| 40 | c |  | 011110 |
| 41 | d |  | 01110 |
| 42 | e |  | 0011 |
| 43 | f |  | 01011101 |
| 44 | g |  | 11001 |
| 45 | h |  | 0001111 |
| 46 | i |  | 1101 |
| 47 | j | 0111110 | 100110 |
| 48 | k |  | 00011101 |
| 49 | l |  | 01010 |
| 50 | m |  | 0001010 |
| 51 | n |  | 1110 |
| 52 | o |  | 11110 |
| 53 | p |  | 0111111 |
| 54 | q | 0111110 | 100111 |
| 55 | r |  | 01100 |
| 56 | s |  | 0000 |
| 57 | t |  | 01000 |
| 58 | u |  | 111111 |
| 59 | v |  | 01011100 |
| 60 | w |  | 11111000 |
| 61 | x | 0111110 | 101000 |
| 62 | y |  | 000100 |
| 63 | z | 0111110 | 101001 |
| EOW |  |  | 10 |
| EOB |  |  | 00011100 |
| *00 |  |  | 00100 |
| *01 |  |  | 00101 |
| *02 |  |  | 01001 |
| *03 |  |  | 11000 |
| *04 |  |  | 000110 |
| *05 |  |  | 010110 |
| *06 |  |  | 0001011 |
| *07 |  |  | 1111101 |
| *08 |  |  | 11111001 |
| *09 | 0111110 | 101010 |
| *10 | 0111110 | 101011 |
| *11 | 0111110 | 101100 |
| *12 | 0111110 | 101101 |
| *13 | 0111110 | 101110 |
| *14 | 0111110 | 101111 |
| *15 | 0111110 | 110000 |

TABLE 5a

|  | A | B | C | D | E | F | G | H | I | J | K | L | M |
|---|---|---|---|---|---|---|---|---|---|---|---|---|---|
| 001 | 0001 | 0001 | 0001 | 0001 | 0001 | 0001 | 0001 | 0001 | 0001 | 0001 | 0001 | 0001 | 0001 |
| 002 | 0022 | 0012 | 0020 | 0012 | 0009 | 0008 | 0008 | 0011 | 0011 | 0012 | 0006 | 0011 | 0017 |
| 003 | 0060 | 0043 | 0051 | 0037 | 0040 | 0048 | 0041 | 0040 | 0037 | 0021 | 0014 | 0046 | 0044 |
| 004 | 0114 | 0185 | 0168 | 0157 | 0070 | 0140 | 0132 | 0136 | 0048 | 0056 | 0051 | 0158 | 0140 |
| 005 | 0263 | 0338 | 0425 | 0272 | 0119 | 0277 | 0245 | 0213 | 0078 | 0080 | 0089 | 0241 | 0229 |
| 006 | 0400 | 0549 | 0719 | 0438 | 0257 | 0401 | 0359 | 0303 | 0167 | 0124 | 0105 | 0330 | 0371 |
| 007 | 0515 | 0661 | 1006 | 0647 | 0383 | 0520 | 0443 | 0415 | 0251 | 0146 | 0104 | 0396 | 0462 |
| 008 | 0583 | 0624 | 1154 | 0724 | 0470 | 0581 | 0377 | 0437 | 0322 | 0106 | 0080 | 0381 | 0543 |
| 009 | 0597 | 0465 | 1092 | 0690 | 0522 | 0438 | 0322 | 0389 | 0430 | 0075 | 0059 | 0303 | 0480 |
| 010 | 0493 | 0331 | 0941 | 0593 | 0442 | 0322 | 0223 | 0307 | 0466 | 0051 | 0039 | 0199 | 0370 |
| 011 | 0355 | 0182 | 0722 | 0456 | 0316 | 0211 | 0121 | 0197 | 0432 | 0022 | 0017 | 0110 | 0258 |
| 012 | 0237 | 0101 | 0483 | 0305 | 0234 | 0094 | 0071 | 0126 | 0328 | 0007 | 0008 | 0064 | 0191 |
| 013 | 0132 | 0052 | 0264 | 0169 | 0108 | 0047 | 0041 | 0058 | 0222 | 0006 | 0009 | 0020 | 0102 |
| 014 | 0054 | 0024 | 0132 | 0088 | 0045 | 0019 | 0016 | 0024 | 0095 | 0001 | 0003 | 0014 | 0043 |

TABLE 5a-continued

| | A | B | C | D | E | F | G | H | I | J | K | L | M |
|---|---|---|---|---|---|---|---|---|---|---|---|---|---|
| 015 | 0027 | 0011 | 0057 | 0053 | 0021 | 0003 | 0003 | 0013 | 0071 | 0000 | 0002 | 0002 | 0021 |
| 016 | 0017 | 0004 | 0035 | 0020 | 0013 | 0003 | 0002 | 0005 | 0039 | 0002 | 0000 | 0002 | 0025 |
| 017 | 0007 | 0003 | 0029 | 0009 | 0003 | 0000 | 0000 | 0000 | 0025 | 0000 | 0001 | 0001 | 0026 |
| 018 | 0001 | 0000 | 0006 | 0000 | 0003 | 0000 | 0000 | 0000 | 0005 | 0000 | 0000 | 0000 | 0016 |
| 019 | 0000 | 0000 | 0001 | 0000 | 0001 | 0000 | 0000 | 0000 | 0004 | 0000 | 0000 | 0000 | 0015 |
| 020 | 0000 | 0000 | 0001 | 0000 | 0002 | 0000 | 0000 | 0000 | 0004 | 0000 | 0000 | 0000 | 0009 |
| 021 | 0000 | 0000 | 0000 | 0000 | 0002 | 0000 | 0000 | 0000 | 0000 | 0000 | 0000 | 0000 | 0005 |
| 022 | 0000 | 0000 | 0001 | 0000 | 0000 | 0000 | 0000 | 0000 | 0000 | 0000 | 0000 | 0000 | 0003 |
| 023 | 0000 | 0000 | 0000 | 0000 | 0001 | 0000 | 0000 | 0000 | 0000 | 0000 | 0000 | 0000 | 0006 |
| 024 | 0001 | 0000 | 0000 | 0000 | 0000 | 0000 | 0000 | 0000 | 0000 | 0000 | 0000 | 0000 | 0002 |
| 025 | 0000 | 0000 | 0000 | 0000 | 0000 | 0000 | 0000 | 0000 | 0000 | 0000 | 0000 | 0000 | 0002 |
| 026 | 0000 | 0000 | 0002 | 0000 | 0000 | 0000 | 0000 | 0000 | 0000 | 0000 | 0000 | 0000 | 0002 |
| 027 | 0000 | 0000 | 0000 | 0000 | 0000 | 0000 | 0000 | 0000 | 0000 | 0000 | 0000 | 0000 | 0002 |
| 028 | 0000 | 0000 | 0000 | 0000 | 0000 | 0000 | 0000 | 0000 | 0000 | 0000 | 0000 | 0000 | 0000 |
| 029 | 0000 | 0000 | 0000 | 0000 | 0000 | 0000 | 0000 | 0000 | 0000 | 0000 | 0000 | 0000 | 0003 |
| 030 | 0000 | 0000 | 0000 | 0000 | 0000 | 0000 | 0000 | 0000 | 0000 | 0000 | 0000 | 0000 | 0001 |
| 031 | 0000 | 0000 | 0000 | 0000 | 0001 | 0000 | 0000 | 0000 | 0000 | 0000 | 0000 | 0000 | 0001 |
| 032 | 0000 | 0000 | 0000 | 0000 | 0000 | 0000 | 0000 | 0000 | 0000 | 0000 | 0000 | 0000 | 0000 |
| 033 | 0000 | 0000 | 0000 | 0000 | 0000 | 0000 | 0000 | 0000 | 0000 | 0000 | 0000 | 0000 | 0000 |
| 034 | 0000 | 0000 | 0000 | 0000 | 0000 | 0000 | 0000 | 0000 | 0000 | 0000 | 0000 | 0000 | 0000 |
| 035 | 0000 | 0000 | 0000 | 0000 | 0000 | 0000 | 0000 | 0000 | 0000 | 0000 | 0000 | 0000 | 0000 |
| 036 | 0000 | 0000 | 0000 | 0000 | 0000 | 0000 | 0000 | 0000 | 0000 | 0000 | 0000 | 0000 | 0000 |
| 037 | 0000 | 0000 | 0000 | 0000 | 0000 | 0000 | 0000 | 0000 | 0000 | 0000 | 0000 | 0000 | 0000 |
| 038 | 0000 | 0000 | 0000 | 0000 | 0000 | 0000 | 0000 | 0000 | 0000 | 0000 | 0000 | 0000 | 0000 |
| TOT | 3879 | 3586 | 7309 | 4671 | 3064 | 3113 | 2405 | 2674 | 3036 | 0703 | 0592 | 2279 | 3389 |

TABLE 5b

| | N | O | P | Q | R | S | T | U | V | W | X | Y | Z |
|---|---|---|---|---|---|---|---|---|---|---|---|---|---|
| 001 | 0001 | 0001 | 0001 | 0001 | 0001 | 0001 | 0001 | 0001 | 0001 | 0001 | 0001 | 0001 | 0000 |
| 002 | 0019 | 0016 | 0013 | 0002 | 0010 | 0011 | 0013 | 0008 | 0006 | 0012 | 0004 | 0002 | 0003 |
| 003 | 0039 | 0035 | 0058 | 0003 | 0050 | 0066 | 0051 | 0015 | 0017 | 0034 | 0000 | 0018 | 0002 |
| 004 | 0066 | 0057 | 0174 | 0008 | 0124 | 0252 | 0164 | 0024 | 0049 | 0127 | 0001 | 0037 | 0001 |
| 005 | 0091 | 0077 | 0299 | 0034 | 0187 | 0639 | 0277 | 0053 | 0074 | 0174 | 0005 | 0029 | 0000 |
| 006 | 0137 | 0122 | 0506 | 0029 | 0381 | 0843 | 0380 | 0137 | 0117 | 0225 | 0001 | 0028 | 0002 |
| 007 | 0174 | 0203 | 0703 | 0043 | 0498 | 1066 | 0487 | 0140 | 0132 | 0295 | 0002 | 0022 | 0000 |
| 008 | 0166 | 0257 | 0676 | 0044 | 0486 | 1194 | 0456 | 0174 | 0158 | 0261 | 0002 | 0023 | 0000 |
| 009 | 0156 | 0224 | 0710 | 0039 | 0409 | 1000 | 0361 | 0210 | 0161 | 0186 | 0002 | 0011 | 0000 |
| 010 | 0111 | 0152 | 0576 | 0029 | 0324 | 0701 | 0285 | 0200 | 0099 | 0129 | 0002 | 0007 | 0000 |
| 011 | 0075 | 0133 | 0419 | 0020 | 0245 | 0437 | 0192 | 0140 | 0055 | 0077 | 0000 | 0003 | 0000 |
| 012 | 0058 | 0067 | 0283 | 0013 | 0138 | 0252 | 0101 | 0108 | 0027 | 0023 | 0000 | 0003 | 0000 |
| 013 | 0040 | 0049 | 0143 | 0010 | 0089 | 0133 | 0062 | 0072 | 0021 | 0007 | 0000 | 0001 | 0000 |
| 014 | 0021 | 0041 | 0075 | 0006 | 0034 | 0066 | 0027 | 0036 | 0008 | 0009 | 0000 | 0000 | 0000 |
| 015 | 0017 | 0019 | 0039 | 0002 | 0010 | 0022 | 0021 | 0016 | 0001 | 0003 | 0000 | 0000 | 0000 |
| 016 | 0005 | 0018 | 0010 | 0001 | 0004 | 0012 | 0007 | 0006 | 0000 | 0001 | 0000 | 0000 | 0000 |
| 017 | 0009 | 0012 | 0003 | 0000 | 0002 | 0004 | 0004 | 0003 | 0000 | 0000 | 0000 | 0000 | 0000 |
| 018 | 0006 | 0011 | 0001 | 0000 | 0000 | 0000 | 0003 | 0001 | 0000 | 0000 | 0000 | 0000 | 0000 |
| 019 | 0005 | 0005 | 0000 | 0000 | 0000 | 0001 | 0000 | 0000 | 0000 | 0000 | 0000 | 0000 | 0000 |
| 020 | 0001 | 0007 | 0000 | 0000 | 0000 | 0000 | 0000 | 0000 | 0000 | 0000 | 0000 | 0000 | 0000 |
| 021 | 0005 | 0007 | 0001 | 0000 | 0000 | 0001 | 0000 | 0000 | 0000 | 0000 | 0000 | 0000 | 0000 |
| 022 | 0005 | 0005 | 0000 | 0000 | 0000 | 0000 | 0000 | 0000 | 0000 | 0000 | 0000 | 0000 | 0000 |
| 023 | 0000 | 0006 | 0000 | 0000 | 0000 | 0000 | 0000 | 0000 | 0000 | 0000 | 0000 | 0000 | 0000 |
| 024 | 0002 | 0004 | 0000 | 0000 | 0000 | 0000 | 0000 | 0000 | 0000 | 0000 | 0000 | 0000 | 0000 |
| 025 | 0001 | 0000 | 0000 | 0000 | 0000 | 0000 | 0000 | 0000 | 0000 | 0000 | 0000 | 0000 | 0000 |
| 026 | 0003 | 0002 | 0000 | 0000 | 0000 | 0000 | 0001 | 0000 | 0000 | 0000 | 0000 | 0000 | 0000 |
| 027 | 0001 | 0001 | 0000 | 0000 | 0000 | 0000 | 0000 | 0000 | 0000 | 0000 | 0000 | 0000 | 0000 |
| 028 | 0001 | 0002 | 0000 | 0000 | 0000 | 0000 | 0000 | 0000 | 0000 | 0000 | 0000 | 0000 | 0000 |
| 029 | 0000 | 0003 | 0000 | 0000 | 0000 | 0000 | 0000 | 0000 | 0000 | 0000 | 0000 | 0000 | 0000 |
| 030 | 0000 | 0001 | 0000 | 0000 | 0000 | 0000 | 0000 | 0000 | 0000 | 0000 | 0000 | 0000 | 0000 |
| 031 | 0001 | 0000 | 0000 | 0000 | 0000 | 0000 | 0000 | 0000 | 0000 | 0000 | 0000 | 0000 | 0000 |
| 032 | 0001 | 0000 | 0000 | 0000 | 0000 | 0000 | 0000 | 0000 | 0000 | 0000 | 0000 | 0000 | 0000 |
| 033 | 0000 | 0000 | 0000 | 0000 | 0000 | 0000 | 0000 | 0000 | 0000 | 0000 | 0000 | 0000 | 0000 |
| 034 | 0000 | 0001 | 0000 | 0000 | 0000 | 0000 | 0000 | 0000 | 0000 | 0000 | 0000 | 0000 | 0000 |
| 035 | 0000 | 0000 | 0000 | 0000 | 0000 | 0000 | 0000 | 0000 | 0000 | 0000 | 0000 | 0000 | 0000 |
| 036 | 0000 | 0000 | 0000 | 0000 | 0000 | 0000 | 0000 | 0000 | 0000 | 0000 | 0000 | 0000 | 0000 |
| 037 | 0000 | 0000 | 0000 | 0000 | 0000 | 0000 | 0000 | 0000 | 0000 | 0000 | 0000 | 0000 | 0000 |
| 038 | 0000 | 0000 | 0000 | 0000 | 0000 | 0000 | 0000 | 0000 | 0000 | 0000 | 0000 | 0000 | 0000 |
| TOT | 1216 | 1537 | 4691 | 0283 | 2993 | 6700 | 2892 | 1343 | 0925 | 1563 | 0019 | 0184 | 0132 | 0011 |

What is claimed is:

1. A character processing system with a spelling check function comprising:
   input means for inputting character information and instructions;
   storage means for storing said character information;
   display means for displaying said character information and said instructions;
   control means, coupled to said input means, said storage means, and said display means, for supplying said character information input by said input means to said storage means for storage therein and for outputting said character information to said display means for display thereon; condensed dictionary storage means including, a dictionary proper composed of a plurality of n-byte blocks, said dictionary proper storing a respective first word in each of said blocks in the form of a character string composed of noncondensed bytes with subsequent words thereafter stored in the form of a condensed relative code with a common part relative to an immediately preceding word as the object, said dictionary proper storing words not transformable into condensed relative code via Huffman encoding allocated in consideration of frequency of occurrence, and an index section for storing offsets derived from the dictionary proper which indicate the number of bytes from an initial position of the dictionary proper a specified block is located and for storing block numbers which indicate the number of blocks in a specified group; and spelling check means, coupled to said control means and said condensed dictionary storage means, for performing a dichotomizing search of a specified block, the address of said specified block being determined thereby as a function of the first two letters of a search word which specify the offset and block number stored in the index section corresponding to the specified block to thereby retrieve said search word.

2. A character processing system according to claim 6 in which the input means is a keyboard provided with a spelling check key for performing a spelling check.

3. A character processing system according to claim 6 in which the condensed dictionary storage means is an IC memory.

4. A character processing system according to claim 6 in which the condensed dictionary storage means is a magnetic disk.

5. A character processing system to claim 6 in which the condensed dictionary storage means is a core memory.

6. A character processing system with a spelling check function comprising:

a dictionary proper composed of a plurality of n-byte blocks, said dictionary proper storing a respective first word in each of said blocks in the form of a character string composed of noncondensed bytes with subsequent words stored in the form of a condensed relative code with a common part relative to an immediately preceding word as the object, said dictionary proper storing words not transformable into condensed relative code via Huffman enclosing allocated in consideration of frequency of occurrence;

an index section for storing offsets derived from the dictionary proper which indicate the number of bytes from an initial position of the dictionary proper a specified block is located and for storing block numbers which indicate the number of blocks in a specified group; and spelling check means, coupled to said dictionary proper and said index section, for performing a dichotomizing search of a specified block, the address of said specified block being determined thereby as a function of the first two letters of a search word, inputted via an input means, which said first two letters specify the offset and block number stored in the index section corresponding to the specified block to thereby retrieve said search word for display on a display means.

7. A character processing system with a spelling check function comprising:

input means for inputting character information and instructions;

storage means for storing said character information;

display means for displaying said character information and said instructions;

control means, coupled to said input means, said storage means, and said display means, controlling transfer of said character information and said instructions therebetween;

condensed dictionary storage means comprising a dictionary proper storing plural blocks of words in the form of noncondensed character strings, condensed relative code, and Huffman encoding, and an index section storing offsets and block numbers specifying respectively the number of bytes from an initial position of the dictionary proper a given block is located and the number of blocks in a given group; and spelling check means, coupled to said control means and said condensed dictionary storage means, for performing a dichotomizing search of a given block, the address of said given block being determined thereby as a function of the first two letters of a search word which specify the offset and block number stored in the index section corresponding to the given block to thereby retrieve said search word for display.

8. A character processing system with a spelling check function comprising:

a dictionary proper storing plural blocks of words in the form of noncondensed character strings, condensed relative code, and Huffman encoding;

an index section storing offsets and block numbers specifying respectively the number of bytes from an initial position of the dictionary proper a given block is located and the number of blocks in a given group; and spelling check means, coupled to said dictionary proper and said index section, for performing a dichotomizing search of a specified block, the address of said specified block being determined thereby as a function of the firs two letters of a search word, inputted via an input means, which said first two letters specify the offset and block number stored in the index section corresponding to the specified block to thereby retrieve said search word for display on a display means.

9. A method of character processing comprising:
inputting character information and instructions;
storing said character information;
displaying said character information and said instructions;
storing words in a dictionary proper composed of a plurality of n-byte blocks whereby a respective first word in each of said blocks is stored in the form of a character string composed of noncondensed bytes with subsequent words thereafter stored in the form of a condensed relative code with a common part relative to an immediately preceding word as the object, and whereby words not transformable into condensed relative code are stored via Huffman encoding and are allocated in consideration of frequency of occurrence;
storing in an index section offsets derived from the dictionary proper which indicate the number of bytes from an initial position of the dictionary proper a specified block is located and block numbers which indicate the number of blocks in a specified group; and checking spelling by performing a dichotomizing search of a specified block, the address of said specified block determined as a function of the first two letters of a search word which specify the offset and block number stored in the index section corresponding to the specified block to thereby retrieve said search word for display.

10. The method of character processing of claim 9 further comprising displaying said search word on a display.

11. A method of character processing comprising:
storing words in a dictionary proper composed of a plurality of n-byte blocks whereby a respective first word in each of said blocks is stored in the form of a character string composed of noncondensed bytes with subsequent words stored in the form of a condensed relative code with a common part relative to an immediately preceding word as the object, and whereby words not transformable into condensed relative code are stored via Huffman encoding and are allocated in consideration of frequency of occurrence;

storing in an index section offsets derived from the dictionary proper which indicate the number of bytes from an initial position of the dictionary proper a specified block is located and block numbers which indicate the number of blocks in a specified group; and checking spelling by performing a dichotomizing search of a specified block, the address of said specified block determined as a function of the firs two letters of an inputted search word which specify the offset and block number stored in the index section corresponding to the specified block to thereby retrieve said search word for display.

* * * * *